(12) United States Patent
Monczynski et al.

(10) Patent No.: US 9,811,070 B2
(45) Date of Patent: Nov. 7, 2017

(54) SELF-ADJUSTING TEST TIME ESTIMATION

(71) Applicant: International Business Machines Corporation, Armonk, NY (US)

(72) Inventors: David Monczynski, San Jose, CA (US); Kaoru Stabnow, Colorado Springs, CO (US); Jason Yue, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 624 days.

(21) Appl. No.: 14/454,892

(22) Filed: Aug. 8, 2014

(65) Prior Publication Data
US 2016/0041543 A1 Feb. 11, 2016

(51) Int. Cl.
G05B 15/02 (2006.01)
G05B 19/042 (2006.01)

(52) U.S. Cl.
CPC ......... *G05B 19/0428* (2013.01); *G05B 15/02* (2013.01); *G05B 2219/14075* (2013.01)

(58) Field of Classification Search
CPC ............... G05B 19/0428; G05B 15/02; G05B 2219/14075
See application file for complete search history.

(56) References Cited

U.S. PATENT DOCUMENTS

| | | | |
|---|---|---|---|
| 2006/0100844 A1* | 5/2006 | Yang | G01R 31/318357 703/21 |
| 2006/0282189 A1* | 12/2006 | Akisawa | G05B 19/41865 700/110 |
| 2009/0070164 A1* | 3/2009 | Knipfer | G06Q 10/087 705/7.12 |
| 2010/0223035 A1 | 9/2010 | Weyh | |
| 2010/0226561 A1* | 9/2010 | Fujikawa | G06T 7/0002 382/141 |
| 2013/0185246 A1 | 7/2013 | Salloum et al. | |

OTHER PUBLICATIONS

IBM, "Apparatus and Method of Test Execution Plan Self Adjustment", IP.com, IPCOM000227687D, May 13, 2013, IBM.

* cited by examiner

*Primary Examiner* — Charles E Anya
(74) *Attorney, Agent, or Firm* — Greg Law Firm, PLLC; Rakesh Garg; Noah Sharkan

(57) ABSTRACT

A test case is executed on a product using a hardware machine, the product being configured in manufacturing according to a configuration, the test case being related to an estimation function. A set of data points resulting from the executing is collected. Using the estimation function, an estimated time needed for the executing is computed. Using the set of data points, an actual time used for the executing is computed. A determination is made whether a difference between the estimated time and the actual time is within a tolerance. Responsive to the difference not being within the tolerance, the estimation function is adjusted using the set of data points and at least one other set of data points, the other set of data points being generated by executing the test case on a second product configured according to a second configuration at a previous time.

19 Claims, 8 Drawing Sheets

FIG. 4

| 402 | 404 | | 406 |
|---|---|---|---|
| T1 | 2 MIN | A 410 | K = 2 |
|    | 2 MIN | B 412 |       |
| T2 | 1.4 MIN | A 416 | P + (B% * DDMs)<br>P = 1, B = 0.2 |
|    | 10.6 MIN | B 418 |  |
| T3 | 60 MIN | A | C * DDMs x Q<br>Q = 10, C = 3 |
|    | 1440 MIN | B |  |
| T4 | 1 MIN | A | R = 1 |
|    | 1 MIN | B |  |

408, 414

| 420 | K + [P + (0.2 DDMs)] + [C x DDMs x Q] + R |
|---|---|

US 9,811,070 B2

SELF-ADJUSTING TEST TIME ESTIMATION

TECHNICAL FIELD

The present invention relates generally to a method, system, and computer program product for testing products in a manufacturing process. More particularly, the present invention relates to a method, system, and computer program product for self-adjusting test time estimation.

BACKGROUND

Customers place orders for products. A manufacturing facility makes a product according to the specification of the customer who ordered that product, a standard specification of a product, or both.

A manufacturing facility typically manufactures a large number of products in this manner. During the manufacturing process, a product has to be tested for a variety of purposes. For example, assume that a manufacturing facility produces customizable computers as products. Each computer comprises numerous parts, which have to be tested for proper functioning either as individual components, in some combination of the components, or both.

A test case is a method of testing all or a portion of a product. Generally, but not necessarily, a test case is implemented as computer executable code. Another form of test case implementation includes operating a machine or an environment according to a plan that is designed for testing a product or a portion thereof. Also, a test case can be partially implemented as computer executable code and partially as a configuration of a machine or an environment.

SUMMARY

The illustrative embodiments provide a method, system, and computer program product for self-adjusting test time estimation. An embodiment includes a method for self-adjusting test time estimation. The embodiment executes, using a hardware machine, a test case on a product, the product being configured in manufacturing according to a configuration, the test case being related to an estimation function. The embodiment collects a set of data points resulting from the executing. The embodiment computes, using the estimation function, an estimated time needed for the executing. The embodiment computes, using the set of data points, an actual time used for the executing. The embodiment determines whether a difference between the estimated time and the actual time is within a tolerance. The embodiment adjusts, responsive to the difference not being within the tolerance, the estimation function, the adjusting using the set of data points and at least one other set of data points, the other set of data points being generated by executing the test case on a second product configured according to a second configuration at a previous time.

Another embodiment includes a computer usable program product comprising a computer readable storage device including computer usable code for self-adjusting test time estimation. The embodiment further includes computer usable code for executing, using a hardware machine, a test case on a product, the product being configured in manufacturing according to a configuration, the test case being related to an estimation function. The embodiment further includes computer usable code for collecting a set of data points resulting from the executing. The embodiment further includes computer usable code for computing, using the estimation function, an estimated time needed for the executing. The embodiment further includes computing, using the set of data points, an actual time used for the executing. The embodiment further includes computer usable code for determining whether a difference between the estimated time and the actual time is within a tolerance. The embodiment further includes computer usable code for adjusting, responsive to the difference not being within the tolerance, the estimation function, the adjusting using the set of data points and at least one other set of data points, the other set of data points being generated by executing the test case on a second product configured according to a second configuration at a previous time.

Another embodiment includes a data processing system for self-adjusting test time estimation. The embodiment further includes a storage device including a storage medium, wherein the storage device stores computer usable program code. The embodiment further includes a processor, wherein the processor executes the computer usable program code. The embodiment further includes computer usable code for executing, using a hardware machine, a test case on a product, the product being configured in manufacturing according to a configuration, the test case being related to an estimation function. The embodiment further includes computer usable code for collecting a set of data points resulting from the executing. The embodiment further includes computer usable code for computing, using the estimation function, an estimated time needed for the executing. The embodiment further includes computing, using the set of data points, an actual time used for the executing. The embodiment further includes computer usable code for determining whether a difference between the estimated time and the actual time is within a tolerance. The embodiment further includes computer usable code for adjusting, responsive to the difference not being within the tolerance, the estimation function, the adjusting using the set of data points and at least one other set of data points, the other set of data points being generated by executing the test case on a second product configured according to a second configuration at a previous time.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a table representing an example manner of determining, creating, or adjusting an estimation function in accordance with an illustrative embodiment;

DETAILED DESCRIPTION

Figure 1:
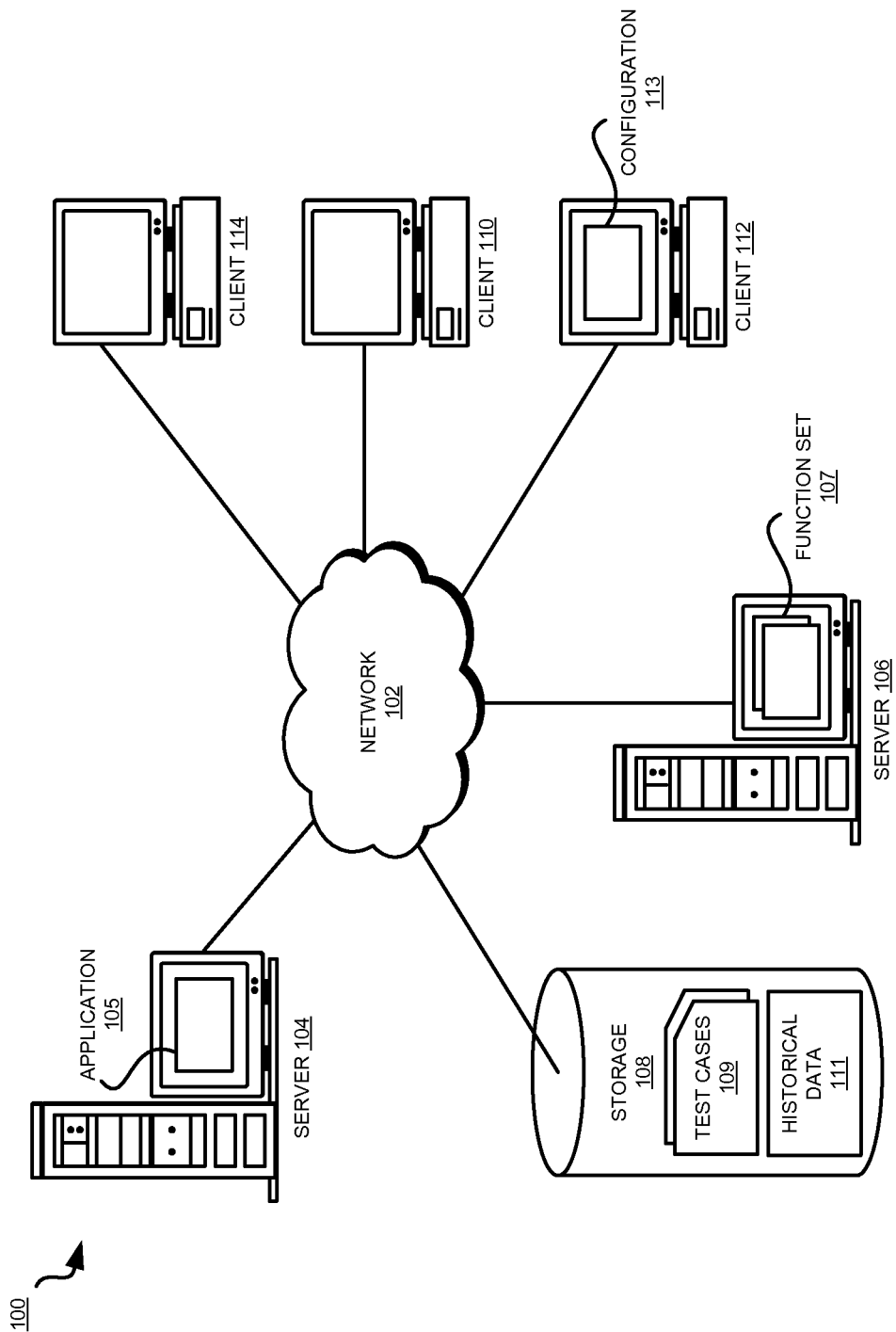
FIG. 1 depicts a block diagram of a network of data processing systems in which illustrative embodiments may be implemented.

Customers have the ability to specify how a product they order is to be custom configured. Given that many products have numerous configurable options, the illustrative embodiments recognize that the total number of possible custom configurations is staggering. The illustrative embodiments recognize that the products being manufactured in present manufacturing environments are often not uniformly configured for this and many other reasons.

The illustrative embodiments recognize that executing a test case on a product or a portion thereof, or otherwise subjecting a product or a portion thereof, (collectively referred to hereinafter as "executing a test case on a product" and other grammatical variations thereof) to a test case consumes certain resources. The time needed to execute a test case on a product is one such example resource. Some other resources consumed in executing a test case on a product include but are not limited to processor cycles, memory space, consumable components of a machine, human expertise, physical space, and many others.

The illustrative embodiments further recognize that a test case can undergo updates and changes, resulting in multiple versions of the same test case. Different versions of a test case often include some portions that are common to the different versions and some portions that are different from one another.

Furthermore, the illustrative embodiments recognize that different configurations of the same product can require different test cases to test for the same objective. In some instances, the different test cases used to test different configurations of a product are different versions of the same test case. The different versions of a test case include some portions that are common to the different versions for testing the commonalities in the different product configurations, and some portions that are different from one another in the various versions for testing corresponding differences in the product configurations.

Consider the execution time of a test case as an example resource that has to be measured and accounted for in a manufacturing environment. The illustrative embodiments recognize that the time taken to execute a test case on a given product is a factor of the product's configuration. For example, the time consumed in executing a test case is a factor of the types and quantities of the components used in the given configuration of a product. Accordingly, even when a test case is usable with products of different configurations, the execution time of the test case can differ from one product to the next owing to their different configurations.

The illustrative embodiments recognize that presently used product testing methods cannot predict or estimate the execution time of a test case for a given configuration with a configuration-related accuracy that is acceptable in manufacturing processes. For example, while a variance of a few seconds or minutes from an estimated execution time of a test case may be acceptable in a lab or a sandbox environment, such variance can throw an assembly line timing, machinery positioning, materials flow, capacity planning, and other manufacturing factors off-plan in a real manufacturing environment.

The illustrative embodiments recognize that presently, in some cases, the execution time of a test case is either a static number that does not change with the configuration being tested and therefore does not reflect the actual execution time of the test case for the given configuration with the requisite accuracy. In some other cases, any change to the execution time of a test case is dependent upon manual adjustments made by technicians based on their individual experiences. The illustrative embodiments recognize that neither method is sufficiently accurate for timing the test case executions within specified tolerances in a manufacturing environment.

The illustrative embodiments used to describe the invention generally address and solve the above-described problems and other problems related to estimating the product configuration dependent testing time in manufacturing processes. The illustrative embodiments provide a method, system, and computer program product for self-adjusting test time estimation.

An embodiment accepts a test case from a test case designer, e.g., a user or an administrator. The test case includes a set of one or more data point markers. A data point marker (marker) emits, sends, transmits, outputs, or otherwise makes available a timestamp of the actual time, or some equivalent thereof, when the marker is reached during the execution of the test case. An amount of time consumed in reaching from one marker to another during the execution relative to a configuration can be computed using the timestamps.

In one embodiment, the designer provides an initial estimation function or formula to estimate the execution time of the test case for a benchmark configuration, e.g., a standard configuration of a product or a portion thereof, to which the test case applies. In another embodiment, the embodiment executes the test case on a benchmark configuration of a product or a portion thereof to which the test case applies.

For example, different portions of the test case may consume different amounts of time because they test different types, numbers, or both, of the components in the configuration. The amount of time consumed by a portion can be determined by comparing the timestamps produced from the markers surrounding the portion. Accordingly, different portions of the test case exhibit different dependencies on the configurations, each dependency being representable by a mathematical expression. The total time consumed by the test case for the configuration is thus a sum of the outputs of all such mathematical expressions.

An embodiment stores a set of historical records of the actual execution times of various portions of various test cases on various configurations. An embodiment also stores in the set of historical records the estimated execution times of those portions of those test cases on those configurations.

Once one or more historical records of the execution times of a portion of a test case for a corresponding portion of a configuration are available, an embodiment determines whether the estimated times were within a defined tolerance or threshold value of the actual times. When an estimated time differs from the corresponding actual time by more than the threshold amount, the embodiment adjusts the estimation function such that the new estimates computed from the adjusted estimation function are within the threshold value of the actual values. As an example, one example embodiment uses the mathematical process of curve-fitting to make the adjustments.

As more executions of a test case are recorded in the historical records database, the adjustments made by an embodiment improve the accuracy of the estimation function owing to the enlarged set of the data points. The adjustment can be to an initial estimation function or a previously created or adjusted estimation function.

Operating in this manner, the historical records database can include records of estimates and actual times of several versions of test cases on several variations of configurations. An embodiment selects from the set of data points that subset of data points where the configurations of the data points correspond to a given configuration either exactly or within a tolerance amount of configuration differences.

Furthermore, some executions of test cases or test case portions can result in a failed test of the corresponding configuration or configuration portion. In one embodiment, the historical records further include an indication of success or failure of previous tests. Accordingly, an embodiment, when estimating an execution time of a portion of a test case on a portion of a given configuration, the embodiment can also estimate a probability of failure of the test. For example, if four out of the previous ten historical records used in the estimation indicate a failed test, the historical probability of failure of the test is forty percent, to wit, based on the historical records, a forty percent chance exists that the test on the given configuration portion will also fail.

The illustrative embodiments are described with respect to certain configurations, products, processes, operations, types of resources, times, estimates, estimation functions, records, tolerances, thresholds, probabilities, logic, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
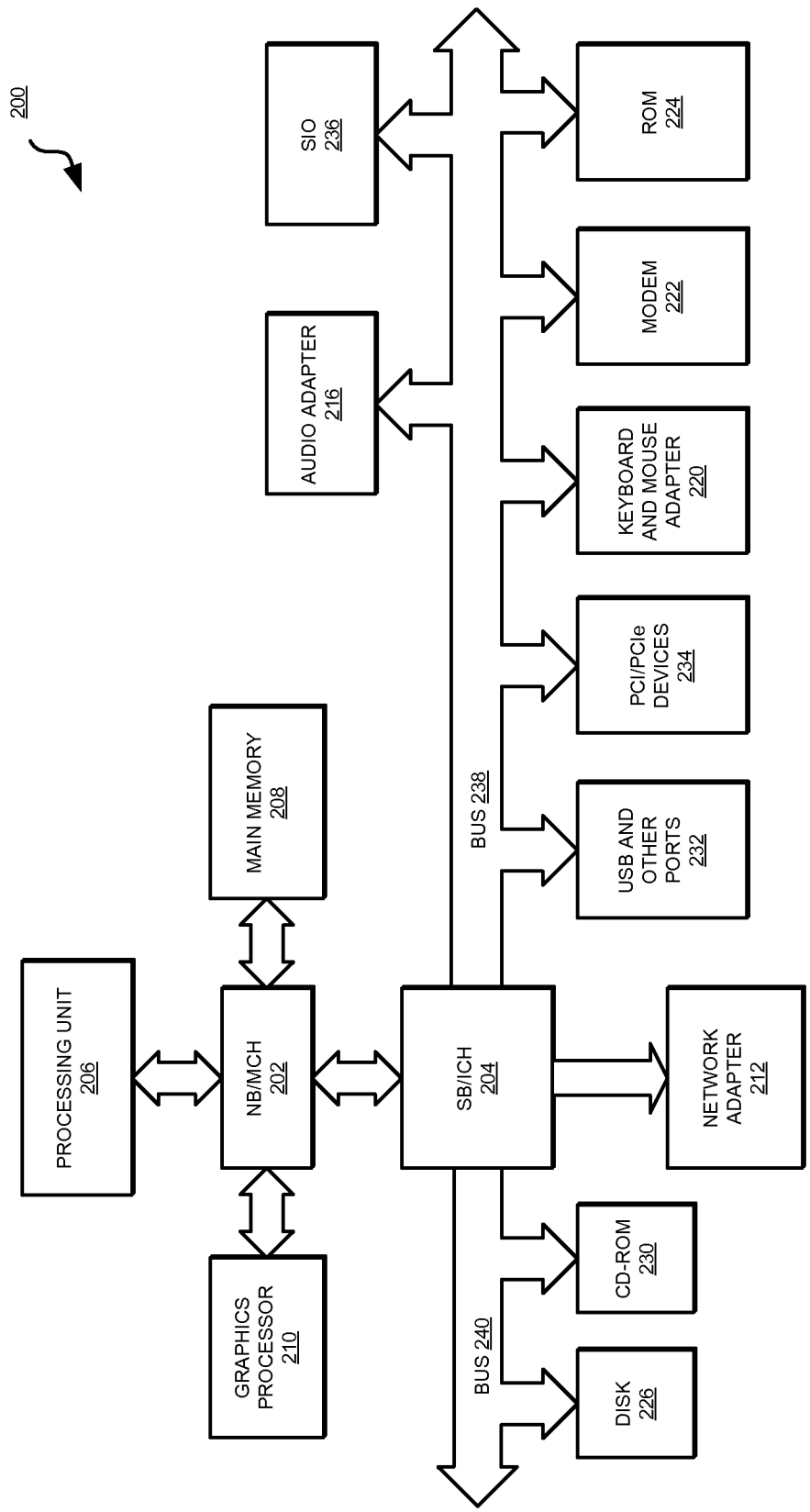
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Application 105 implements one or more embodiments described herein. Function set 107 comprises a library of mathematical functions, a function from which is usable in an estimation function, usable as a part of an estimation function, usable as an estimation function, or a combination thereof. Test cases 109 comprise one or more versions of one or more test cases that are applicable to one or more configurations of one or more products. Historical data 111 comprises any number of historical records as described elsewhere in this disclosure with respect to an embodiment. Configuration 113 is an example configuration of a product with respect to which a test case or a portion thereof from test cases 109 can be executed.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a system or a configuration therein, such as system 113 in FIG. 1 in which computer usable program code or instructions implementing the processes of the illustrative embodiments may be located. Data processing system 200 is described as a computer only as an example, without being limited thereto. Implementations in some forms, e.g., a customized machine (not shown) to execute a test case, may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, test cases 109, or functions in function set 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
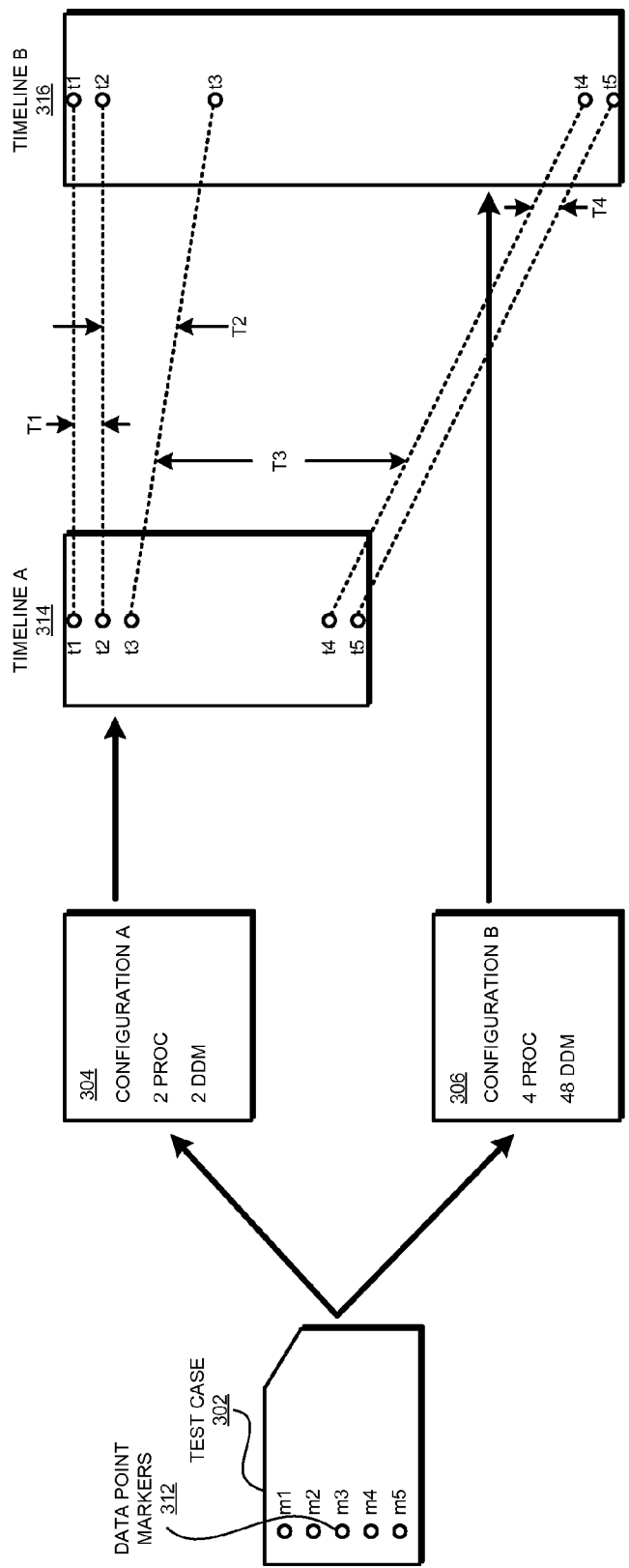
FIG. 3 depicts an example configuration for self-adjusting test time estimation in accordance with an illustrative embodiment.

With reference to FIG. 3, this figure depicts an example configuration for self-adjusting test time estimation in accordance with an illustrative embodiment. An embodiment, such as an embodiment implemented as application 105 in FIG. 1 tracks the execution of test case 302 on configurations 304 and 306. Test case 302 is an example of all or a portion of a test case from test cases 109 in FIG. 1. Configuration 304, labeled "configuration A", is one example of configuration 113 in FIG. 1. Configuration 306, labeled "configuration B", is different from configuration A and is another example of configuration 113 in FIG. 1.

Only as an example and without implying any limitations thereto, assume that configurations A and B are partial configurations of a computer product. Configuration A provides that the product has two processors and two disk drive modules (DDM, plural DDMs). Configuration B provides that the product has four processors and forty eight DDMs.

Test case 302 includes a set 312 of markers. Timeline 314, labeled "timeline A", is the elapsed time in executing test case 302 relative to configuration A. Timeline 316, labeled "timeline B", is the elapsed time in executing test case 302 relative to configuration B.

When test case 302 is executed relative to configurations A and B, each marker in set 312 of markers outputs a timestamp or otherwise marks a point in time in timelines A and B, respectively. Assume only as an example and without implying any limitation thereto, a marker in set 312 of markers comprises a current time printing code in test case 302, and prints the current time each time the code of the marker is executed during the execution of test case 302.

Only as an example, assume that set 312 of markers includes markers labeled "m1", "m2", "m3", "m4", and "m5". When test case 302 is executed relative to configuration A, marker m1 produces timestamp or another suitable indication of time t1 in timeline A, which is indicative of a time the code of marker m1 was executed in that execution. Similarly, marker m2 produces timestamp t2, marker m3 produces timestamp t3, marker m4 produces timestamp t4, marker m5 produces timestamp t5 in timeline A. When test case 302 is executed relative to configuration B, marker m1 similarly produces timestamp t1 in timeline B, which is indicative of a time the code of marker m1 was executed in that execution. Similarly, marker m2 produces timestamp t2, marker m3 produces timestamp t3, marker m4 produces timestamp t4, marker m5 produces timestamp t5 in timeline B.

In each of timeline A and timeline B, T1 represents the elapsed time between t1 and t2, T2 represents the elapsed time between t2 and t3, T3 represents the elapsed time between t3 and t4, T4 represents the elapsed time between t4 and t5. Owing to the differences in configurations A and B, some or all of T1, T2, T3, and T4 elapsed periods can be different.

In the depicted example, T1 appears to be unchanged regardless of the differences in configurations A and B, suggesting that the portion of test case 302 that is bound by markers m1 and m2 is not configuration dependent. T2 appears to have changed from timeline A to timeline B, owing to the differences in configurations A and B, suggesting that the portion of test case 302 that is bound by markers m2 and m3 is configuration dependent. T3 appears to have changed from timeline A to timeline B, owing to the differences in configurations A and B, suggesting that the portion of test case 302 that is bound by markers m3 and m4 is configuration dependent. T4 appears to be unchanged regardless of the differences in configurations A and B, suggesting that the portion of test case 302 that is bound by markers m4 and m5 is not configuration dependent.

An embodiment, such as an embodiment implemented in application 105 in FIG. 1, stores the elapsed times T1-T4 from timelines A and B in a historical record database, such as historical data 111 in FIG. 1. According to another embodiment, the application also stores any estimates for T1-T4 that were predicted prior to the execution of test case 302 relative to configurations A and B with their corresponding elapsed times records. According to another embodiment, the application further stores with their corresponding records, information sufficient to match configurations A and B with future configurations.

Note that five example markers, four example elapsed times, two example configurations, two example timelines, and one example test case are depicted and described only as examples and not to imply any limitations on the illustrative embodiments. Those of ordinary skill in the art will be able to use any number of markers in any number of test cases, relative to any number of configurations, in any number of executions to produce any number of timelines with any number of elapsed times with an embodiment in this disclosure, and such usage is contemplated within the scope of the illustrative embodiments.

With reference to FIG. 4, this figure depicts a table representing an example manner of determining, creating, or adjusting an estimation function in accordance with an illustrative embodiment. Column 402 lists the elapsed time components of a test case, e.g., T1, T2, T3, and T4 of test case 302 as described in FIG. 3. Column 404 lists, for each elapsed time component, one or more historical records of those times from various executions relative to various configurations in the past. Column 406 lists, for each elapsed time component, a mathematical expression—an estimation function—that yields an estimate that is within a threshold of the corresponding historical times of various configurations noted in column 404.

Consider row 408 as an example. Row 408 shows that for elapsed time T1, two historical records exist from timelines A and B, which resulted from the execution of test case 302 relative to configurations A and B, respectively, in FIG. 3. Record 410 shows that T1 was 2 minutes in timeline A. Record 412 shows that T1 was 2 minutes in timeline B. This confirms that the portion of test case 302 that is bound by markers m1 and m2 is not configuration dependent. Accordingly, column 406 in row 408 represents T1 and its non-dependency on the tested configuration with an expression K. K is a constant, and in this example has the value 2.

$$T1=K; \text{ where } K=2$$

Consider row 414 as an example. Row 414 shows that for elapsed time T2, two historical records exist from timelines A and B, which resulted from the execution of test case 302 relative to configurations A and B, respectively, in FIG. 3. Record 414 shows that T1 was 1.4 minutes in timeline A. Record 416 shows that T1 was 10.6 minutes in timeline B. This confirms that the portion of test case 302 that is bound by markers m2 and m3 is configuration dependent. Accordingly, column 406 in row 414 represents T2 and its dependency on the tested configuration with an expression. The expression provides that T2 can be represented as a constant (P) plus a constant percentage (B) (e.g., twenty percent) of the number of DDMs in the tested configurations. K is a constant, and in this example has the value 2.

$$T2=P+(B*DDMs); \text{ where } P=1, \text{ and } B=0.2$$

Similarly, an embodiment determines that T3 is configuration dependent, and expressed as a constant (C), multiplied by the number of DDMs in the tested configuration, multiplied by a second constant (Q).

$$T3=C*DDMs*Q; \text{ where } C=3, \text{ and } Q=10$$

Similarly, an embodiment determines that T4 is configuration independent and expressed as a constant (R), whose value is 1.

$$T4=R; \text{ where } R=1$$

An embodiment determines a suitable expression to exactly match or approximate within a tolerance the actual times of the historical records by utilizing any suitable curve-fitting or other method. For example, in one embodiment, an expression selected to fit the historical records in this manner is present, e.g., in a template form, in function set 107 in FIG. 1. The embodiment determines a suitable modification of a template function, such as by assigning suitable values to the constants in the template expression to result in the expressions in column 406.

An embodiment determines the estimation function of a test case by combining the expressions of all constituent elapsed time components of the test case. For example, having fitted T1, T2, T3, and T4 to suitable expressions as described above, the embodiment creates or adjusts estimation function 420 of test case 302 as follows—

Estimation function of test case 302=Expression for T1+Expression for T2+Expression for T3+Expression for T4

Which for the above described example is:

$$K+[P+(B*DDMs)]+[C*DDMs*Q]+R$$

The example number of historical records, values, expressions, and estimation function described with respect to FIGS. 3 and 4 are not intended to be limiting on the illustrative embodiments. Using these examples and the description of the various embodiments in this disclosure, those of ordinary skill in the art will be able to create other expressions and estimation functions using other numbers of historical records and values, and the same are contemplated within the scope of the illustrative embodiments.

Figure 5:
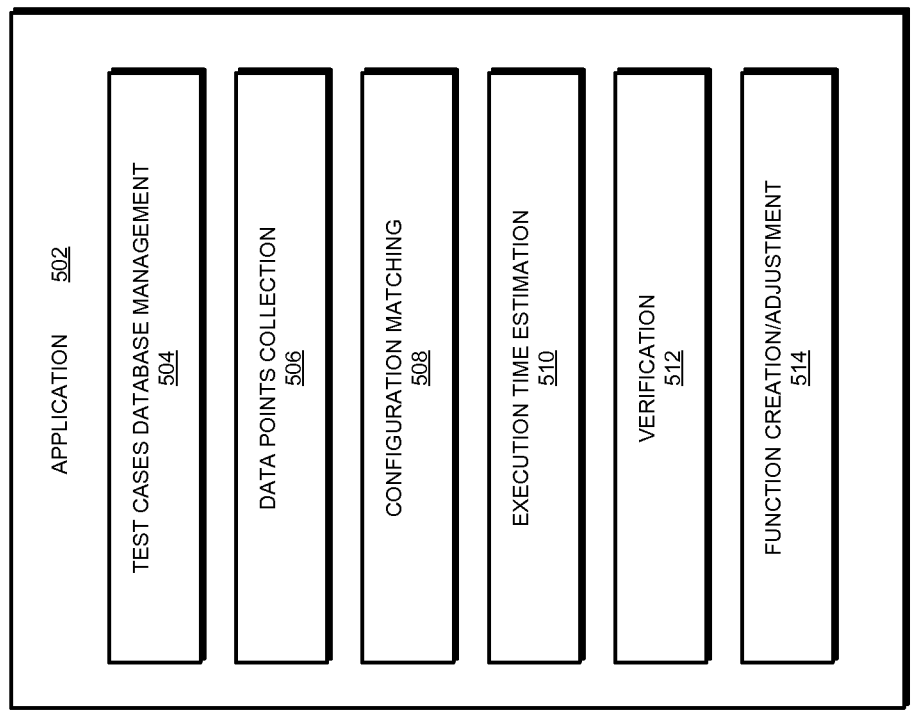
FIG. 5 depicts a block diagram of an example configuration for self-adjusting test time estimation in accordance with an illustrative embodiment.

With reference to FIG. 5, this figure depicts a block diagram of an example configuration for self-adjusting test time estimation in accordance with an illustrative embodiment. Application 502 is an example of application 105 in FIG. 1. Application 502 can be used to implement one or more embodiments described with respect to FIGS. 3 and 4 and elsewhere in this disclosure.

Component 504 performs test case database management functions. For example, component 504 facilitates adding new test cases, modifying an existing test case in test cases 109 in FIG. 1, deleting an existing test case, and otherwise manipulating test cases 109 in FIG. 1. Furthermore, component 504 facilitates similar manipulations of other things affecting test cases, such as adding, changing, deleting, or other manipulations of functions in function set 107 in FIG. 1.

Component 506 collects the data points generated during the execution of a test case. For example, timestamps t1-t5 corresponding to markers m1-m5 in FIG. 3 are examples of data points collected by component 506.

Component 508 performs configuration matching. For example, component 508 determines the subset of historical records to choose from the set of historical records in a database by comparing a configuration to be tested with the configurations associated with the historical records.

Component 510 estimates the execution time of a test case based on the estimation function that can be constructed from the selected subset of historical records. For example, given the subset of historical records, component 510 identifies one or more time components that will be observed in the test case that is to be used with the configuration that is to be tested. Using the expressions associated with those time components, component 510 constructs an estimation function, e.g., estimation function 420 as described with respect to an example in FIG. 4.

Application 502 executes the test case, or causes the test case to be executed relative to the configuration that is to be tested. Once the test case has been executed relative to the configuration and the data points have been collected from that execution, component 512 verifies whether the actual execution time and the constituent time components match the estimates calculated from the estimation function and the constituent expressions, respectively, within a specified threshold.

When the actual execution time, or a constituent time component therein, does not match within the threshold the estimate calculated from the estimation function, or from the corresponding constituent expression, respectively, component 514 facilitates adjusting the expression, the estimation function, or both. Component 514 further facilitates creating new expressions for new time components, new estimation functions for new test cases or portions thereof, or a combination of new expressions and estimation functions.

Figure 6:
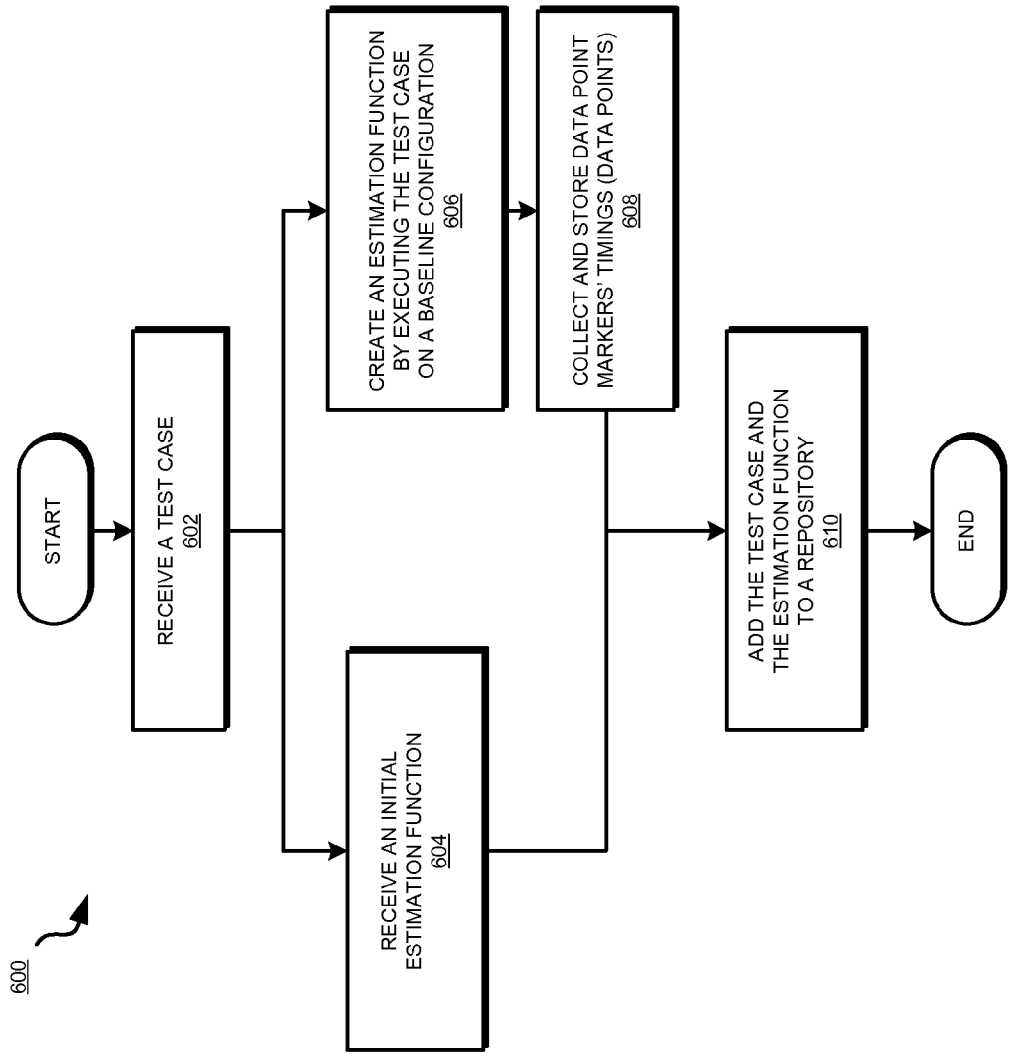
FIG. 6 depicts a flowchart of an example process for adding a new test case with an initial estimation function in accordance with an illustrative embodiment.

With reference to FIG. 6, this figure depicts a flowchart of an example process for adding a new test case with an initial estimation function in accordance with an illustrative embodiment. Process 600 can be implemented in application 502 in FIG. 5.

The application receives a test case, e.g. from a test case designer (block 602). In some cases, the application receives an initial estimation function with the test case, such as an estimation function created by the designer (block 604). The application then proceeds to block 610 in such cases.

In some other cases, the application creates an estimation function by executing the test case on a baseline or benchmark configuration (block 606). The application collects and stores the data points from the baseline or benchmark execution (block 608).

The application adds the test case and the estimation function to a repository (block 610). The application ends process 600 thereafter.

Figure 7:
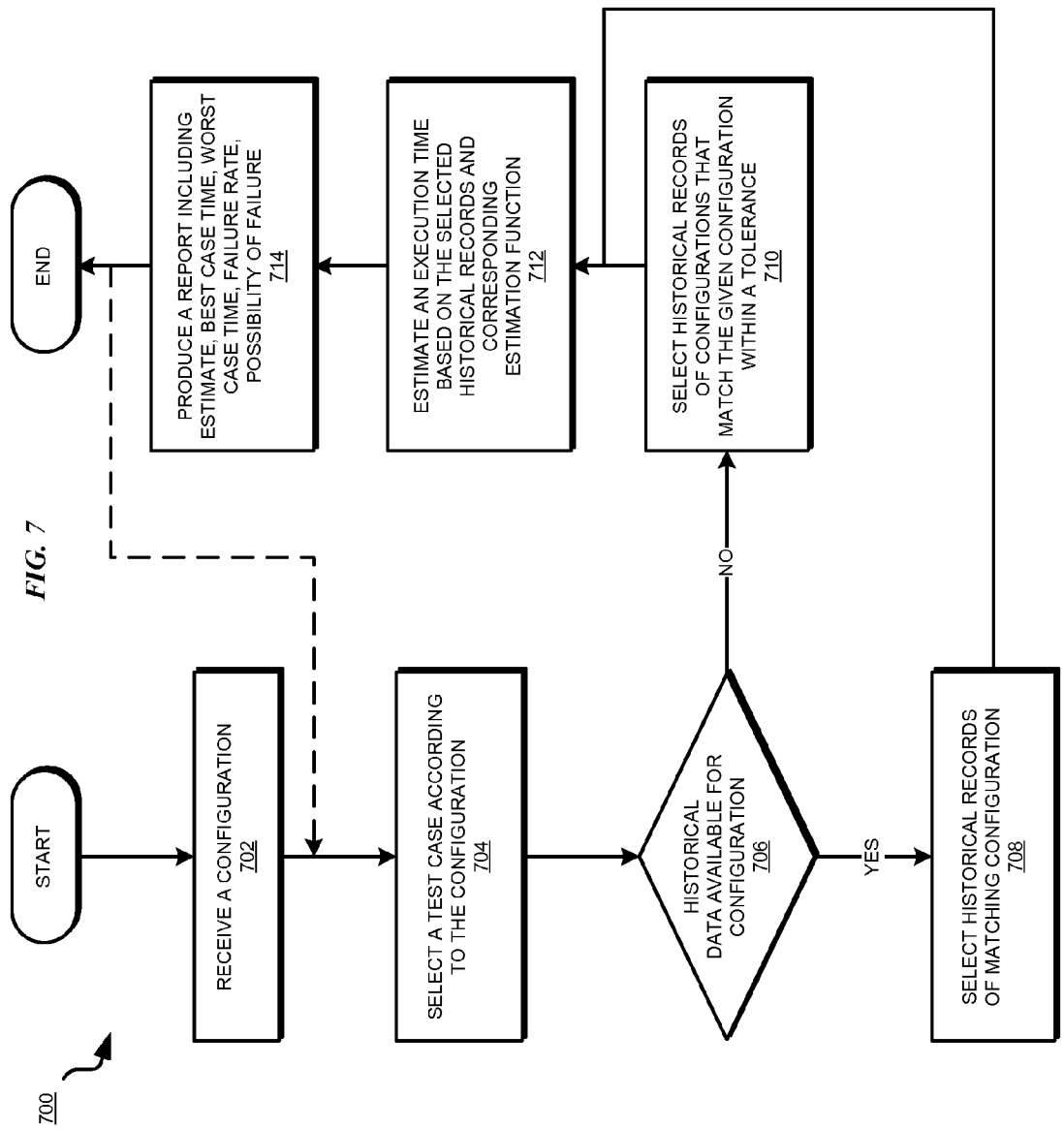
FIG. 7 depicts a flowchart of an example process for self-adjusting test time estimation in accordance with an illustrative embodiment.

With reference to FIG. 7, this figure depicts a flowchart of an example process for self-adjusting test time estimation in accordance with an illustrative embodiment. Process 700 can be implemented in application 502 in FIG. 5.

The application receives a configuration that has to be tested (block 702). The application selects a test case that is applicable to the configuration (block 704). The application determines whether historical data is available where a configuration matching the present configuration has been tested using the test case (block 706).

If the historical data is available ("Yes" path of block 706), the application selects the historical records of the matching configuration (block 708). The application then proceeds to block 712.

If the historical data of a matching configuration is not available ("No" path of block 706), the application selects the historical records of a configuration that matches the present configuration within a specified tolerance (block 710). The application estimates an execution time based on the selected historical records and a corresponding estimation function (block 712). The estimation function can be determined for the selected test case or portions thereof based on the selected historical records as described elsewhere in this disclosure.

The application produces a report (block 714). The application ends process 700 thereafter. According to one embodiment, the report generated in block 714 includes the estimated execution time. According to another embodiment, the report generated in block 714 further includes the best case estimated execution time. According to another embodiment, the report generated in block 714 further includes the worst case estimated execution time. According to another embodiment, the report generated in block 714 further includes a probability of failure in the execution of the test case on the configuration.

A test operation can be configured to use a list of tests cases. Process 700 is described with respect to one test case only for clarity and not to imply a limitation on the illustrative embodiments. Process 700 can be repeated, e.g., by repeating blocks 704-714 any number of times for any number of test cases in a list of test cases within the scope of the illustrative embodiments.

Figure 8:
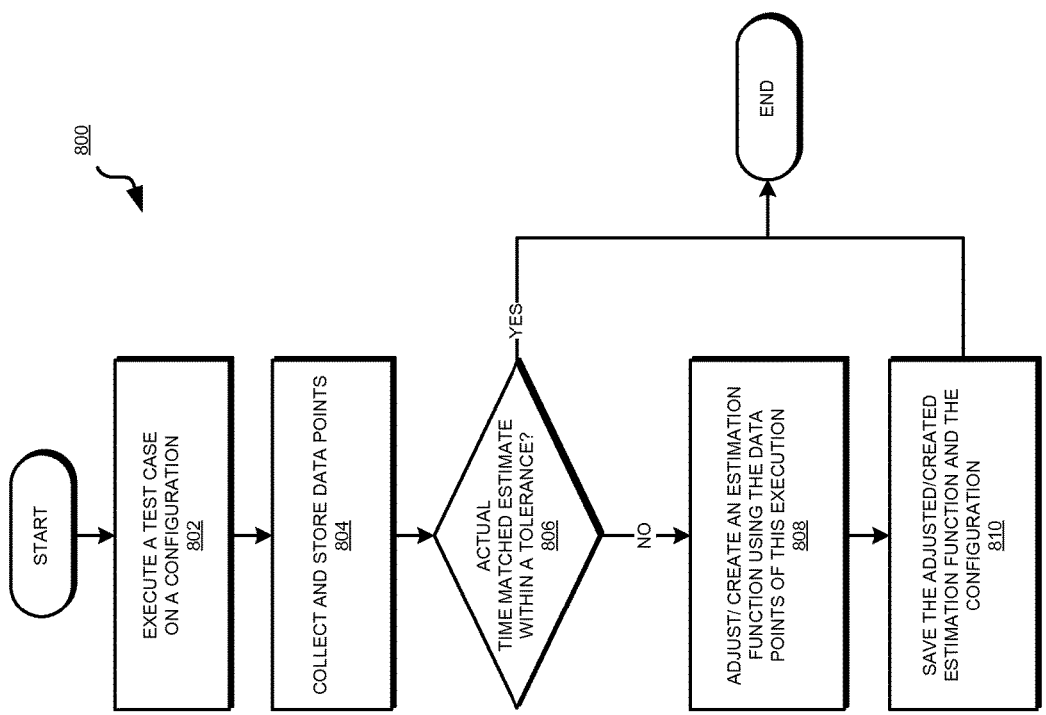
FIG. 8 depicts a flowchart of an example process for adjusting an execution time estimation function in accordance with an illustrative embodiment.

With reference to FIG. 8, this figure depicts a flowchart of an example process for adjusting an execution time estimation function in accordance with an illustrative embodiment. Process 800 can be implemented using application 502 in FIG. 5.

The application executes a test case on a configuration (block 802). The application collects the data points output from the execution (block 804). The application determines whether the actual execution time, or a time component thereof, matches the estimated time, or a time component thereof, within a threshold (block 806). If the times match within the threshold ("Yes" path of block 806), the application ends process 800 thereafter.

If the times or time components do not match within the threshold ("No" path of block 806), the application, using the data points from the present execution, adjusts an existing time estimation function or an expression therein, or optionally creates a new estimation function or an expression therein (block 808). The application saves the adjusted or created estimation function including any adjusted or created time component expressions, along with the configuration used in block 802 (block 810). The application ends process 800 thereafter.

Thus, a computer implemented method, system or apparatus, and computer program product are provided in the illustrative embodiments for self-adjusting test time estimation. Any step or operation of an embodiment described with respect to a test case is similarly usable with a portion of a test case within the scope of the illustrative embodiments. Any step or operation of an embodiment described with respect to a configuration is similarly usable with a portion of a configuration within the scope of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for self-adjusting test time estimation, the method comprising:
   executing, using a hardware machine, a test case on a product, the product being configured in manufacturing according to a configuration, the test case being related to an estimation function;
   collecting a set of data points resulting from the executing;
   computing, using the estimation function, an estimated time needed for the executing;
   computing, using the set of data points, an actual time used for the executing;
   determining whether a difference between the estimated time and the actual time is within a tolerance;
   adjusting, responsive to the difference not being within the tolerance, the estimation function, the adjusting using the set of data points and at least one other set of data points, the other set of data points being generated by executing the test case on a second product configured according to a second configuration at a previous time, wherein the second configuration is a baseline configuration; and
   creating an initial estimation function related to the test case using the other set of data points, wherein the estimation function is the initial estimation function, wherein the adjusting uses the set of data points and the other set of data points in a curve-fitting algorithm to change the initial estimation function into a second estimation function, wherein the second estimation function causes the difference between the estimated time and the actual time to be within a tolerance.

2. The method of claim 1, further comprising:
   generating a data point in the set of data points by encountering a data point marker located in the test case, wherein the data point marker outputs an indication of a time at which the data point marker was encountered during the executing.

3. The method of claim 1, further comprising:
   computing the estimated time using a set of time components, wherein the estimated time comprises the set of time components, and wherein each time component in the set of time components has a corresponding expression, each corresponding expression participating in the estimation function.

4. The method of claim 3, further comprising:
   evaluating, for a first time component in the set of time components, a corresponding first expression according to the configuration, wherein the first expression is dependent on the configuration.

5. The method of claim 3, further comprising:
   evaluating, for a second time component in the set of time components, a corresponding second expression, wherein the second expression is independent of the configuration.

6. The method of claim 3, further comprising:
   selecting, from a set of historical records, a subset of historical records, a record in the subset of the historical records comprising an actual value of a time component in the set of time components when the test case was previously executed relative to the second configuration, the record including a data point from the other set of data points.

7. The method of claim 6, further comprising:
   comparing the configuration with the second configuration of the record;
   determining that the configuration matches the second configuration within a threshold degree; and
   selecting the record into the subset of historical records responsive to the configuration matching the second configuration within the threshold degree.

8. The method of claim 6, further comprising:
   comparing the configuration with a third configuration of a second record;
   determining that the configuration does not match the third configuration within the threshold degree; and
   omitting selecting the second record into the subset of historical records responsive to the configuration not matching the third configuration within the threshold degree.

9. The method of claim 1, wherein the test case is a portion of a second test case, and wherein the configuration specifies a portion of the product.

10. The method of claim 1, wherein the test case comprises computer usable instructions and the hardware machine comprises a processor and a memory, wherein the computer usable instructions are executed using the processor and the memory.

11. A computer usable program product comprising a computer readable storage medium including computer usable code for self-adjusting test time estimation, the computer usable code when executed by a processor cause operations of a method to be performed, the method comprising:

executing, using a hardware machine, a test case on a product, the product being configured in manufacturing according to a configuration, the test case being related to an estimation function;

collecting a set of data points resulting from the executing;

computing, using the estimation function, an estimated time needed for the executing;

computing, using the set of data points, an actual time used for the executing;

determining whether a difference between the estimated time and the actual time is within a tolerance;

adjusting, responsive to the difference not being within the tolerance, the estimation function, the adjusting using the set of data points and at least one other set of data points, the other set of data points being generated by executing the test case on a second product configured according to a second configuration at a previous time, wherein the second configuration is a baseline configuration; and creating an initial estimation function related to the test case using the other set of data points, wherein the estimation function is the initial estimation function, wherein the adjusting uses the set of data points and the other set of data points in a curve-fitting algorithm to change the initial estimation function into a second estimation function, wherein the second estimation function causes the difference between the estimated time and the actual time to be within a tolerance.

12. The computer usable program product of claim 11, further comprising:

generating a data point in the set of data points by encountering a data point marker located in the test case, wherein the data point marker outputs an indication of a time at which the data point marker was encountered during the executing.

13. The computer usable program product of claim 11, further comprising:

computing the estimated time using a set of time components, wherein the estimated time comprises the set of time components, and wherein each time component in the set of time components has a corresponding expression, each corresponding expression participating in the estimation function.

14. The computer usable program product of claim 13, further comprising:

evaluating, for a first time component in the set of time components, a corresponding first expression according to the configuration, wherein the first expression is dependent on the configuration.

15. The computer usable program product of claim 13, further comprising:

evaluating, for a second time component in the set of time components, a corresponding second expression, wherein the second expression is independent of the configuration.

16. The computer usable program product of claim 13, further comprising:

selecting, from a set of historical records, a subset of historical records, a record in the subset of the historical records comprising an actual value of a time component in the set of time components when the test case was previously executed relative to the second configuration, the record including a data point from the other set of data points.

17. The computer usable program product of claim 11, wherein the computer usable code is stored in a computer readable storage medium in a data processing system, and wherein the computer usable code is transferred over a network from a remote data processing system.

18. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

19. A data processing system for self-adjusting test time estimation, the data processing system comprising:

a storage device including a storage medium, wherein the storage device stores computer usable program code; and a processor, wherein the processor executes the computer usable program code, causing operations of a method to be performed, the method comprising:

executing, using a hardware machine, a test case on a product, the product being configured in manufacturing according to a configuration, the test case being related to an estimation function;

collecting a set of data points resulting from the executing;

computing, using the estimation function, an estimated time needed for the executing;

computing, using the set of data points, an actual time used for the executing;

determining whether a difference between the estimated time and the actual time is within a tolerance;

adjusting, responsive to the difference not being within the tolerance, the estimation function, the adjusting using the set of data points and at least one other set of data points, the other set of data points being generated by executing the test case on a second product configured according to a second configuration at a previous time, wherein the second configuration is a baseline configuration; and creating an initial estimation function related to the test case using the other set of data points, wherein the estimation function is the initial estimation function, wherein the adjusting uses the set of data points and the other set of data points in a curve-fitting algorithm to change the initial estimation function into a second estimation function, wherein the second estimation function causes the difference between the estimated time and the actual time to be within a tolerance.

* * * * *